Patented Apr. 21, 1925.

1,534,050

UNITED STATES PATENT OFFICE.

PAUL BARRIELLE, OF APT, FRANCE.

MANUFACTURE OF PRESERVED FRUITS.

No Drawing.   Application filed April 19, 1923.   Serial No. 633,281.

*To all whom it may concern:*

Be it known that I, PAUL BARRIELLE, a citizen of France, residing at Apt, France, have invented new and useful Improvements in the Manufacture of Preserved Fruits, of which the following is a specification.

In processes used at the present time for manufacturing preserved fruits, the latter such as cherries or plums or apricots are first placed in a weak sugar solution and left there until the fruit and the syrup reach the same concentration, whereupon a little water is evaporated in the open, and the whole is left to stand until a new state of equilibrium is reached. Another evaporation or "façon" then takes place and so on, until after eight or ten evaporations the desired product is obtained.

According to this invention preserved fruit can be manufactured more quickly, and at the same time the labour and the expenditure for fuel is reduced to a considerable extent. Moreover as the manufacture is automatic, it is independent of the skill of the staff.

The chief characteristic of this process is that the proportion of sugar in the fruit is increased by a methodical and continuous diffusion, that is to say that the sugar solution passes from the fruits containing the highest proportion of sugar, to the fresh fruits which are introduced into the manufacture. This operation therefore takes place in a closed cycle, because after having passed through the fresh fruits the sugar solution (the proportion of sugar in which has been gradually decreasing during its passage) is brought again to its initial degree of concentration before being brought into contact again with the fruit ready for removal.

A solution of the greatest possible concentration is therefore brought to the lowest possible concentration without any evaporation taking place between the said two states, unlike other processes.

By separating from the fruits the weak sugar solutions during their concentration, any risk of caramelization at the moment of evaporation is obviated, and by carrying out the operation in a vacuum, any inversion of the saccharose and of dextrins is avoided, which is an important point for preventing the fruit from subsequently sticking together and forming a shapeless mass.

The apparatus that can be utilized for carrying out the process are similar to the diffusers used in sugar mills or to the macerators of beetroot distilleries.

A given number of them are arranged one after another, the chief point being that it should be possible to connect them together in a such a manner as to admit the syrup into each of them at the bottom, in the preserving vat and discharge it at the top in order to convey it into the next preserving vat at the bottom, or conversely to admit it at the top and discharge it at the bottom in order to convey it into the next preserving vat at the top.

In the following description, given merely by way of example, the process has been described as applied to the manufacture of preserved cherries.

Let it be assumed that there are twenty vats, and that at the moment the vat 1 is in the most advanced stage of manufacture, and the vat 20 has just been emptied. Into the lower part of the vat 1 is admitted syrup of the maximum concentration, that is to say of 39° Baumé at a temperature of 50° centigrade; this syrup being constituted by saccharose, by glucose, by syrup drained off from a preserving vat which has previously finished its work, and by the syrup of weak concentration which has escaped from the vat 19 and has been concentrated in a vacuum apparatus. This syrup displaces the solution contained in the vat 1, which in passing into the vat 2, in its turn expels the liquid contained in the vat 3, and so on. This syrup therefore meets in its passage less and less preserved fruits, and arrives finally in the vat 20 which has been just filled again with fresh fruit.

On escaping from the vat 20 the syrup passes to the evaporator where it is concentrated in a vacuum before being again taken into the process.

It will be seen therefore that the liquid follows a continuous and an uninterrupted cycle.

The introduction of the concentrated syrup takes place at 2; 1 is successively emptied and then filled with fresh fruit, and the liquid escaping from 20, passes through it before going to the evaporator, and so on.

A heating device makes it possible to maintain in the vats a temperature preferably between 50° and 75° centigrade.

The process just described works by methodical diffusion, the fruits which are in contact with solutions of gradually increasing richness in sugar give off their water by osmosis, while the diffusion of sugar which takes place through the cellulose part of the fruits, accumulates more and more sugar in the latter.

I claim:

1. A process for the manufacture of preserved fruit by methodical diffusion consisting in bringing a syrup rich in sugar into contact with fruit contained in a plurality of vats, restoring the syrup to its initial degree of concentration after the passage thereof through the several vats, and returning the syrup to the vats for further contact with the fruit, thus operating in a closed cycle.

2. A process for the manufacture of preserved fruits by diffusion consisting in passing a highly concentrated solution of sugar successively through fruits contained in a plurality of vats, restoring the solution of weak concentration passing from the last vat to its initial high concentration and heating and returning it to the first vat.

In witness whereof I affix my signature.

PAUL BARRIELLE.